United States Patent [19]

Scheuerman

[11] Patent Number: 5,270,018

[45] Date of Patent: Dec. 14, 1993

[54] APPARATUS FOR WITHDRAWING A PARTICULATE SOLID FROM A PACKED, NON-FLUIDIZED BED

[75] Inventor: Georgieanna L. Scheuerman, Crockett, Calif.

[73] Assignee: Chevron Research Company, San Francisco, Calif.

[21] Appl. No.: 805,151

[22] Filed: Dec. 11, 1991

Related U.S. Application Data

[63] Continuation of Ser. No. 285,144, Dec. 16, 1988, Pat. No. 5,098,230, which is a continuation of Ser. No. 913,036, Sep. 29, 1986, abandoned, which is a continuation of Ser. No. 619,763, Jun. 12, 1984, abandoned.

[51] Int. Cl.⁵ .............................. B01J 8/02; B01J 8/08; B01J 8/08
[52] U.S. Cl. .................................. 422/213; 422/219; 422/232; 422/233
[58] Field of Search ............... 422/140, 143, 145, 232, 422/233, 213, 216, 218, 219

[56] References Cited

U.S. PATENT DOCUMENTS 3,706,536 12/1972 Greenwood et al. .......... 422/216 X
4,968,409 11/1990 Smith ............................. 422/213 X Primary Examiner—Robert J. Warden
Assistant Examiner—Amalia Santiago
Attorney, Agent, or Firm—V. J. Cavalieri; A. W. Klaassen

[57] ABSTRACT

Apparatus for withdrawing particulate spent catalyst particles from a packed, non-fluidized bed of such particles in contact with a liquid medium within a vessel wherein the apparatus is a withdrawal conduit or pipe which has an inlet that opens within the bottom of the bed and faces generally downwardly so that a first section extends upwardly from the inlet, and a second section extends downwardly, and the spent catalyst particles exits the packed bed through a uniform and continuous flow path opening into a solids recovery vessel whose pressure is controlled to regulate flow of such spent catalyst from the reaction vessel independent of the rate of flow through the withdrawal conduit.

5 Claims, 2 Drawing Sheets

APPARATUS FOR WITHDRAWING A PARTICULATE SOLID FROM A PACKED, NON-FLUIDIZED BED

RELATED APPLICATIONS

This application is a continuation of U.S. application Ser. No. 07/285,144, filed Dec. 16, 1988, now U.S. Pat. No. 5,098,230 which was a continuation of U.S. application Ser. No. 06/913,036 filed Sep. 29, 1986, now abandoned, which was a continuation of U.S. application Ser. No. 06/619,763 filed Jun. 12, 1984, now abandoned.

DESCRIPTION

1. Technical Field

This invention relates to removing particles from a vessel containing a densely packed bed such as an ion exchange water treatment tank or a hydroprocessing reactor. More particularly, the invention relates to removal of such solids in a controllable manner without the necessity for mechanical valving in areas of the system occupied by the solid particles.

2. Background Art

It is frequently desirable but inherently difficult to move substantial amounts of solid particles in a controllable way through systems of vessels and conduits. A major obstacle to such control is that conventional valves which are the method of choice for controlling the transport of fluids are subject to undue amounts of abrasion and wear and tear when operated in the presence of solid particles. Nevertheless, a number of industrial scale processes require the use of solids, such as water treatment, separations and purifications employing ion exchange resins, and, perhaps most prominently, processes which are conducted under the influence of a solid catalyst.

The petroleum industry has for many years been a major user of such processes and, in this instance, the problem is further aggravated by the necessity for maintaining high temperature and pressure conditions in reaction vessels as well. In a large number of petroleum refining processes, such as reforming, and such hydroprocessing reactions as demetalization and desulfurization, fluid feedstocks are reacted in the presence of substantial amounts of solid particulate catalytic materials, which catalytic materials are subject to deactivation during the reactions they facilitate. Accordingly, typically a particular sample of catalyst becomes spent in a relatively short period of several weeks to a few months. It is, then, clear that the transfer of solid particles becomes necessary for at least two reasons—first, for sampling purposes to ascertain whether or not replacement is necessary and, second, movement of large amounts of catalyst into and out of reactors to secure a fresh supply of catalyst. Of course, the latter problem can be solved by dismantling the reactor when the catalyst is sufficiently spent; and the former can be obviated by a precalibrated system of continuous catalyst replacement. However, in either case, it is necessary to move the solid catalyst particles in a controlled way from the inside of the reaction vessel to an accessible position outside of it.

The problem of removing small sample amounts of catalyst from the reaction vessel for assessment purposes has been approached in a number of ways. U.S. Pat. No. 3,561,274 to Haunschild discloses a sampler for use in densely packed reaction vessels operating at high pressure which takes advantage of a mechanical rotating action to dislodge samples of solids, which are encouraged to exit the vessel by a combination, apparently, of gravity and pressure differential. The flow can be shut off either by mechanical valving, or by the natural resistance of the particles to flow.

U.S. Pat. No. 3,973,440 discloses a device which encourages initial upward vertical flow followed by a gravity-assisted drop. It is suitable to a densely packed bed of solid particles. This device draws material into the outlet tube by a sudden decrease in pressure following clearing the sampling tube with a heated purge gas. During operation, the flow of solids is controlled in part by valves in the exit line.

U.S. Pat. No. 3,487,695 also to Haunschild uses an external supply of gas to clear a vertical gravity assisted path for removal of a small sample of solid particles from a densely packed reactor. The removal path is an uninterrupted downward flow.

U.S. Pat. No. 3,653,265 uses the differential pressure between the reaction vessel and a solids receiver to create a gas stream wherein the catalyst flow is driven upward and out. The flow is controlled by an offsetting quantity of purge gas.

U.S. Pat. No. 3,336,217 to Meaux takes advantage of an ebullant bed situation in a reactor vessel to fluidize the particulates in such a way that, unless counterpressure is applied, the particles are capable of traveling up and out of the vessel past a valve. To terminate the flow of particles., the mechanical valve in their path is closed and the sampling tube purged with a gas stream.

The foregoing procedures appear suitable for withdrawal for small portions of catalyst for sampling purposes. Those withdrawal ports which operate on dense-packed solids agitate small quantities desirable for sampling. Where a densely-packed bed is not available to offer resistance to flow, as in 3,336,217, the withdrawal tube relies on mechanical valves in the port to stop the flow of particles. Those systems which are designed for packed beds rely on purge gas systems to create clear pathways for particulate transport.

Other approaches have been taken where movement of catalyst is required as an integral part of the process which is carried out as a catalyzed reaction in a high temperature and pressure reaction vessel. A number of such processes related to hydroprocessing which include catalyst exchange have been proposed. For example, U.S. Pat. No. 3,826,737 discloses a continuous process for catalytic treatment of hydrocarbons where the catalyst flows cocurrently with the process stream downward through the reactor and is withdrawn through a system of valves from the bottom of the vessel. U.S. Pat. No. 3,880,598 discloses both a cocurrent and countercurrent process again withdrawing solids directly from the bottom of the reactor. U.S. Pat. No. 4,259,294 proposes a series of cocurrently moving bed reactors supplied from a single catalyst reservoir, but again, catalyst is withdrawn directly from the bottom of the vessels. A number of other cocurrent and countercurrent processing systems, wherein catalyst is moved through the reactor on either a continuous or a controlled intermittent basis are disclosed in U.S. Pat. Nos. 3,910,834, 3,795,607, 4,312,741, and 3,716,478. In all of the foregoing, the catalyst is simply withdrawn from the bottom of the reactor and, thus, the flow, to the extent that it is controlled, must be regulated at least to some extent by mechanical valving sytems.

An alternate system, disclosed in U.S. Pat. No. 3,716,478, relies on a liquid discharge from an opposing tube whose inlet port is positioned directly opposite the incoming fluid conduit. The exit conduit is placed in a horizontal position but mechanical valves remain in the system.

For gas/solid systems only, such as those employed in petroleum reforming, it has been disclosed that an inverted U-tube catalyst withdrawal system which relies on periodic release of a gas-flow created counter pressure in the inverted U can be used (copending application Ser. No. 537,023, filed Sep. 29, 1983, and assigned to the same assignee).

The present invention offers a catalyst withdrawal and dumping system which is adaptable to large-scale liquid medium based hydroprocessing reactions in high-pressure vessels. It utilizes a fluid-controlled valving system wherein the fluid contacting these particles is liquid to move particles from a densely packed catalyst bed to a receiving vessel external to the reaction chamber. The apparatus and method of the present invention can be used, of course, for sampling purposes as well. While mechanical valves can be included in the system within the path of transport of the solid particles, their use is not an inherent part of the system, and the flow of catalyst particles can be controlled entirely by pressure regulation in parts of the system which do not experience direct particle flow.

Disclosure of the Invention

The invention provides a practical and efficient method of transferring large amounts of particulate materials from a vessel where they are maintained in a densely packed bed in contact with liquid medium to another vessel at lower pressure by regulating the pressure differential between the intake portion of the withdrawal means and its exit port. The particles to be removed follow a pathway which has an initial upward component followed by a generally downward course out of the container. The necessity for the particles to traverse the upward portion of the pathway results both in a barrier to transport in the absence of the pressure differential and in assuring that the particles are sufficiently dislodged from their dense packed status to move comfortably through the conduit.

Thus, in one aspect, the invention relates to an apparatus for removing solid particles from a densely packed bed which comprises a withdrawal conduit providing in a first portion a generally upward pathway and, in a second portion, a generally downward pathway, a means for creating a pressure differential so that the pressure at the inlet of the upward pathway portion is greater than the pressure at the outlet of the downward pathway portion, and for providing sufficient liquid to create a fluidized condition of the densely packed particles at the inlet as a result of this pressure differential.

In another aspect, the invention relates to a method of withdrawing solid particles from a densely packed particle bed in a liquid medium which comprises fluidizing the particles at a location proximal to an inlet port of a conduit which provides an initial upward path and a secondary downward path for these particles.

In still another aspect, the invention relates to a novel apparatus which serves as a withdrawal conduit for particulates comprising an annular barrier providing an annular upward pathway succeeded by a segment providing a downward pathway. In this aspect, the apparatus is configured so as to provide an outlet conduit extending above the bottom of the vessel, a cover disposed with respect to the outlet tube so as to provide an annular barrier which extends below the height of the outlet tube above the bottom of the vessel, and a means for fluidizing the particulate solid between the annular barrier and the outlet conduit.

DETAILED DESCRIPTION

A. Definitions

Figure 1:
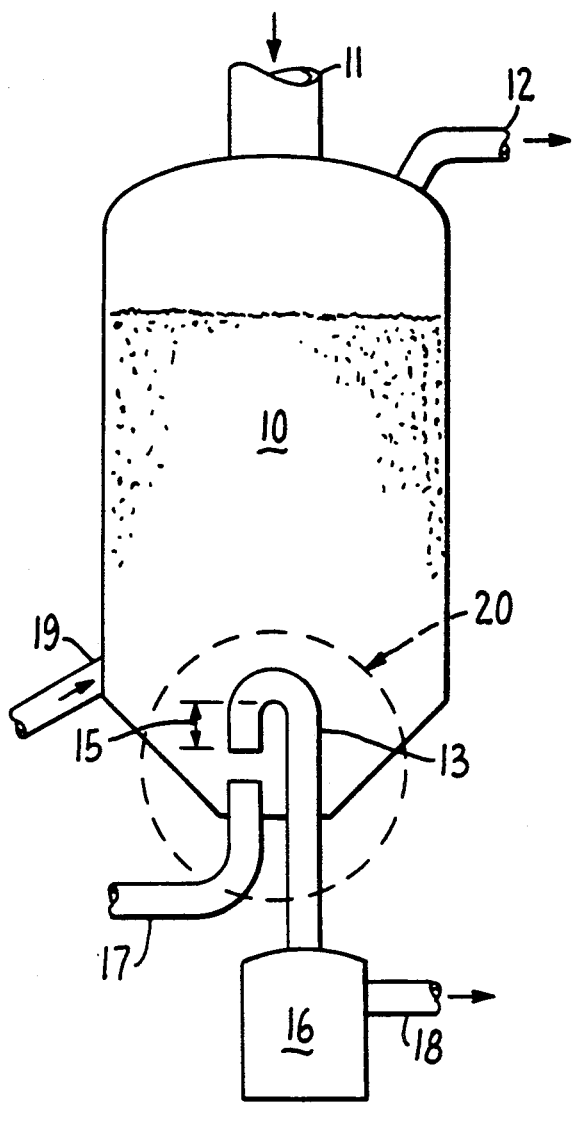
FIG. 1 is a schematic diagram of an inverted J embodiment.

As used herein, "fluidized" refers to the state of a solid/fluid mixture herein a solid/liquid mixture wherein movement of the liquid is capable of transporting the contained solid. Transport of solid particles is often described in terms of "dense phase transport" and "dilute phase transport". Solid/liquid mixtures wherein dilute phase transport takes place are often referred to as suspensions, whereas, in dense phase transport, this term is less frequently, but occasionally, used.

"Dense phase transport" and "dilute phase transport" refer to two extremes of a continuum. In dense phase transport, the void volume with respect to occupancy of space by solid particles is quite small and any movement of solids is accounted for by the viscous drag of the admixed liquid. In dilute phase transport, on the other hand, the voidage is relatively large, often on the order of 80–90% of the total volume, and the weight of the suspended particles is largely supported by the buoyancy of the liquid. Clearly, it is not realistic to set an arbitrary or definite boundary between the dense phase and the dilute phase conditions as there is, in fact, no discontinuity between these two extremes. In any event, in the operation of the withdrawal system and method of the invention, "fluidized" can refer to particles in contact with liquid under conditions which could conceivably fit either of these descriptions and the term "fluidized" has a functional meaning. If the solid particles are sufficiently suspended in the liquid to permit them to traverse the upward segment of their removal path, they are "fluidized" in the definition of the invention.

"Upward" flow or pathway refers to a direction of transport which has at least a component vector which is vertical. It is not limited to directly vertical upward pathways. "Downward" is comparably defined.

"Pressure differential" includes differentials created by whatever means are applicable and known in the art. The means include pumps, suction created by liquid flow in response to removal of fluid from the receiving vessel, and injection of additional materials to the high-pressure vessel.

B. Detailed General Description

The apparatus and methods of the invention are appropriate to withdrawal of solid particles from vessels where the solid is in contact with a liquid medium, which are maintained at a variety of conditions including high temperatures and pressures, and are applicable to removal of both large and small amounts of solid. They are thus capable of use as both sampling techniques and as methods of dumping entire contents of large vessels. The methods and apparatus of the invention are not limited by the ambient temperature and pressure conditions inside the vessel which serves as the source of the solid particles. The only conditions required are sufficient fluidization of the solid/liquid mixture to permit movement of the particles over a upward pathway segment. This condition can be generated by creation and maintenance of a pressure differential or by local fluidization due to injection of additional liquid. Since the upward path is present only to provide a barrier to uncontrolled particle flow, it need be of no particular ratio to the downward flow path length. The ratio of the upward path volume to the total conduit volume can be, and preferably is, less than 0.1.

In the method of the invention, the solid particles are caused to be transported through the withdrawal apparatus which comprises a first portion of a pathway which is in an upward direction and which has an inlet port inside the vessel, and a second, downward, pathway portion which has an exit port outside the vessel. The apparatus also comprises some means of fluidizing the solid/liquid mixture immediately preceding the inlet port. When the means for fluidization is applied, the solids are transported through the upward segment, and then, by gravity, descend through the downward portion and exit the vessel. By discontinuing the operation of the means for fluidizing the mixture, the solids fail to negotiate the upward portion, and flow of the solid particles from the vessel is stopped. Such means need not include mechanical valves in the path traversed by the solid particles. The following embodiments illustrate the operation of the method of the invention with respect to two particular designs of the conduit which form the upward and downward portion of the pathway. The invention is not limited to these.

C. The Inverted J-Tube Design

One convenient embodiment of the invention is illustrated in FIG. 1. As shown in FIG. 1, the reaction vessel 10 is filled with the solid particles by adding the particles in a liquid slurry through the port 11 to a level below the exit conduit 12. The exit conduit is designed to accomodate the withdrawal of fluids. In this illustration, the particles are supplied in sufficient quantity that the bed of particles is densely packed. In order to withdraw particles from the vessel, the inverted J-tube 13 is used. When the particles below the J-tube inlet 14 are densely packed, they lack sufficient vertical momentum to permit them to traverse the vertical distance 15 and no solids withdrawal takes place. However, when it is desired to withdraw solids, the packed material immediately below the inlet port is fluidized in the suspension liquid and the particles are able to flow over the J and out into the collection vessel 16.

FIG. 1 illustrates two ways to create this fluidization. In one alternative, additional liquid is supplied through the inlet tube 17. This pumps additional liquid into the vessel immediately below the inlet port of the inverted J. When sufficient fluidization has taken place due to the inflow of liquid, solids are withdrawn by virtue of gravity once they are sufficiently supported by liquid momentum to ascend the distance 15, even if vessel 16 and vessel 10 are at the same pressure overall. Stopping the liquid flow through tube 17, therefore, results in an interruption in solid particle withdrawal. This flow can be stopped using valves external to the solids flow pathway.

Alternatively, the pressure in receiving vessel 16 can be maintained and regulated to be lower than that in the vessel 10. When the pressure differential is maintained to be sufficiently lower than that prevailing in the reaction vessel 10, the particles below the inlet of J-tube 13 become fluidized and exit the vessel. The precise pressure differential required is, of course, dependent on the design parameters of the apparatus—e.g., the height of the upward path, the size and density of the particles, the specific gravity of the liquid. Thus, this is a functional definition. The pressure differential must be sufficient to fluidize the particles and permit them to traverse the upward path. When the pressure differential is dropped below that amount, the flow of particles stops.

The pressure differential can be maintained by a variety of means. For example, in systems where the pressure in the vessel 10 is higher than atmospheric pressure, simple release of fluid through the outlet 18 from the receiving vessel 16 will create the desired drop. The fluid release may be either of the liquid which transports the solids from the vessel, or of a gas phase which accumulates above it due, for example, to vaporization or to degassing of the carrier liquid. A gas phase may, indeed, be intentionally introduced to permit metering thereof, in lieu of regulating the liquid flow directly. The control of the released fluid, and, therefore, the pressure, difference, can be handled entirely by valve 44 in the fluid circuit downstream from outlet 18. There is no necessity for valves in the downward portion of the J tube.

If the vessel is operating at atmospheric pressure, as would frequently be the case in water treatment applications, the pressure difference could be generated by applying a vacuum to the receiver 16 at the outlet 18. Again, this is controlled in a portion of the system which is downstream from outlet 18. Also, an injection of an increased amount of liquid through the inlet port 19 to vessel 10 can create increased pressure generally in the vessel.

D. The Annular Configuration

In another aspect, the invention relates to a convenient configuration of the solids withdrawal apparatus which is usable in both solid/liquid and solid/gas systems. This configuration comprises an annular shield which interrupts horizontal traverse of the particles and necessitates their travel in an upward direction in order to access the downward portion of the path. By "annular shield" is meant a barrier which extends the entire 360 degrees surrounding the exit port; however, this does not imply that the barrier need be circular—it may be of any workable shape.

Figure 2A:
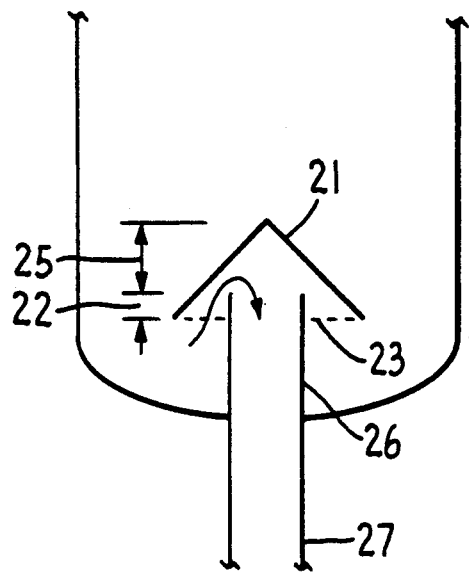
FIG. 2a and 2b are diagrams of the inverted cone embodiment.

FIG. 2a illustrates the features of one specific embodiment of this configuration of the withdrawal apparatus. It corresponds to an alternative configuration to the withdrawal area containing a J-tube which is indicated by "20" in FIG. 1, as do all embodiments of this configuration. Rather than the upward path being described by the shorter portion of the inverted J, the upward path is determined by the inverted cone 21 so that the height to which the particles must travel in order to exit the vessel is represented by the vertical distance 22 as shown in FIG. 2a. The particles may travel though the additional height 25 but this is not required. The particles then exit through the conduit 26 to an outlet port 27. It is clear that the upward path need not be created by the overlapping portions of a conical roof as shown in FIG. 2a. All that is required is an annular covered barrier at a level below the height of the outlet tube so that exiting particles are interrupted in the horizontal component of their transport and forced to traverse an upward path in order to reach the outlet. Thus, for example, an inverted hemisphere might conveniently be used. Though less uniform and symmetric, an inverted rectangular box or hollow pyramid could be used. Other aspects of the apparatus are optionally the same as shown in FIG. 1. Use of this withdrawal port depends on creation of fluidization conditions in the mixture of solid and liquid or gas in the region immediately below the inlet port 23. This can be done by the same alternative approaches as those discussed in connection with FIG. 1.

Figure 2B:
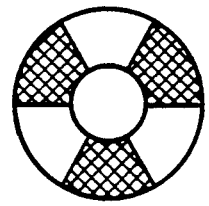

One major advantage of this novel configuration is that the transverse dimension of the particle path can be regulated by screening off portions of the radial path open to the particles as shown in FIG. 2b. Thus the size of the exit port can be controlled at those portions in direct contact with the densely packed bed without affecting the dimensions of the outlet portion connected to the receiving vessel. Greater or lesser areas of fluidized solids can be placed in effective communication with the outlet conduit by screening the desired fraction of the horizontal cross section of the overhang of the annular barrier.

E. Integration into a Processing System

Figure 3:
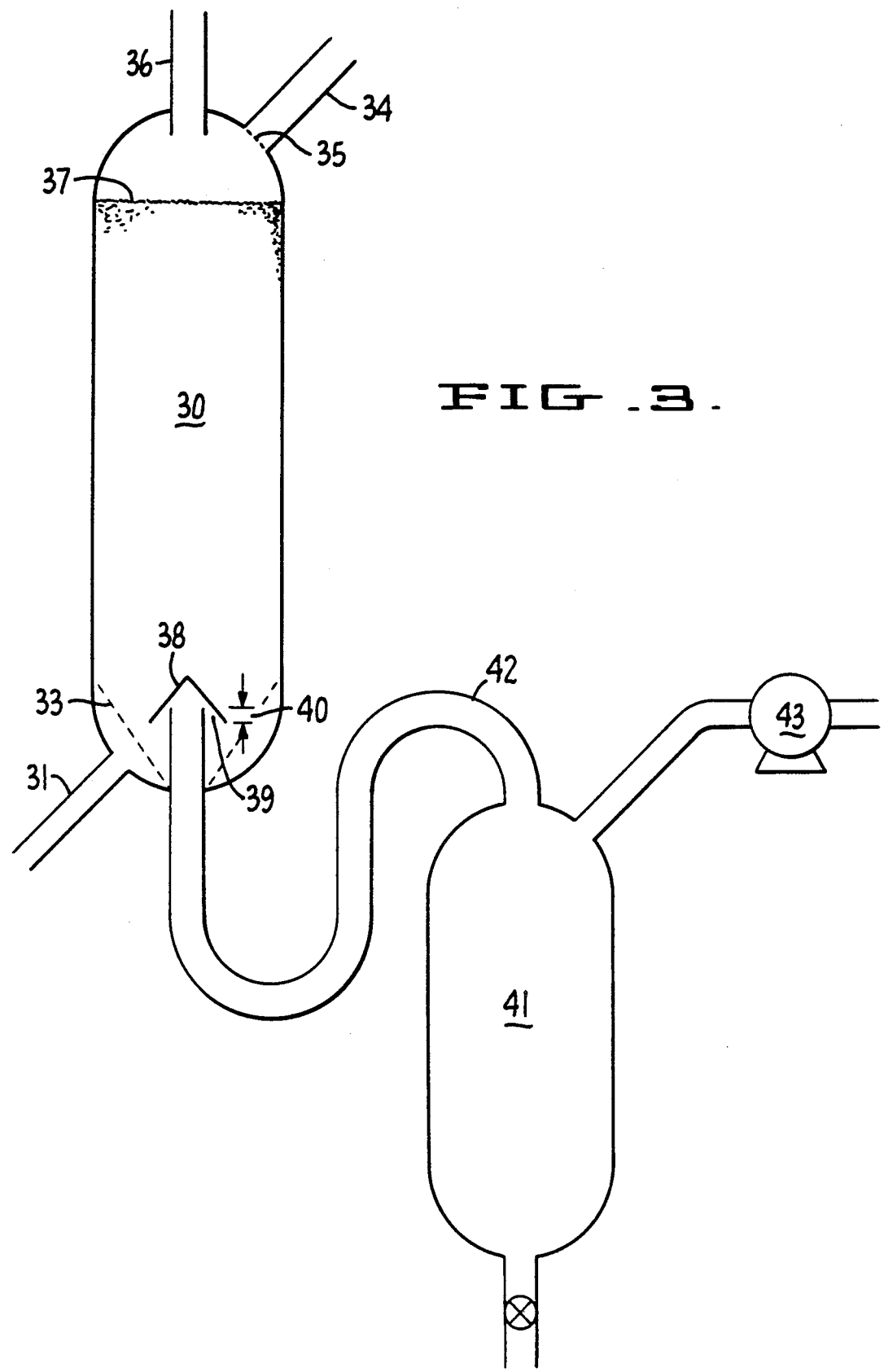
FIG. 3 is a schematic showing the application of the withdrawal system to a countercurrent reactor.

FIG. 3 shows an apparatus which utilizes the embodiment shown in FIG. 2 as a portion of a countercurrent system of catalyst exchange, i.e., the direction of catalyst flow is countercurrent with respect to a reactant stream. As shown in FIG. 3, the reaction stream to reaction vessel 30 is fed through line 31 at the bottom of the vessel. The catalyst is prevented from back flowing through line 31 by the screen 33 which simply acts as a physical barrier to the transport of catalyst.

The reactant stream which had entered at 31 continues through the solid bed of catalyst which nearly fills the reactor as shown, and is exited at the effluent tube 34 at the top of the vessel. An additional screen 35 is provided to prevent any extraneous catalyst flow through this port.

Catalyst is fed into the vessel at 36 sufficient to maintain the level at the desired location such as 37. The catalyst is removed through the apparatus of the invention which is shown as an inverted cone 38 under which is disposed an exit conduit 39. The path traversed by the catalyst particles is an upward segment described by the vertical distance 40. In this embodiment, creation of a pressure differential between the vessel 30 and the receiving vessel 41 results in flow of the catalyst particles over the vertical distance 40 and through the outlet tube 42 into the receiving vessel 41 where the gas/liquid and solid are separated by gravity. The pressure differential is then created by removal of the fluid fraction, either the gas portion alone or a portion of fluid including the liquid, such as by means of the pump 43, if the reaction vessel is at atmospheric pressure, or by release of fluid to the atmosphere in the case of high pressure reactions.

I claim:

1. An apparatus for removing particulate solids from a non-fluidized densely packed bed of said solids in a reactor vessel which comprises:
   a. a reactor vessel;
   b. a densely packed non-fluidized bed of particulate catalyst in contact with liquid reactants disposed within said reactor vessel;
   c. a receiving vessel;
   d. a conduit having an upwardly facing inlet port above the bottom of and within said packed non-fluidized bed, said conduit extending generally downwardly from said inlet port to an outlet port outside said reactor vessel and opening into said receiving vessel;
   e. a cover extending above and covering said inlet port, and having a bottom edge extending below said inlet port and completely encircling said conduit, said cover being disposed with respect to said conduit so as to provide an annular space between said bottom edge of said cover and said conduit; and
   f. means for creating a pressure differential between said inlet port of said outlet conduit and said receiving vessel and thereby directing particulates from said non-fluidized densely packed bed to said receiving vessel.

2. The apparatus of claim 1 wherein said cover is shaped as an inverted cone.

3. The apparatus of claim 1 wherein said cover is shaped as hollow hemisphere.

4. An apparatus for carrying out catalyzed hydrocarbon reactions at elevated temperatures and pressures comprising:
   a. a reactor vessel;
   b. a packed non-fluidized bed of particulate catalyst in contact with liquid reactants disposed within said reactor vessel;
   c. a spent catalyst receiving vessel;
   d. first conduit means opening into the bottom of said reactor vessel for feeding a liquid hydrocarbon reactant upwardly into said reactor vessel;
   e. second conduit means opening into the top of said reactor vessel for withdrawing liquid hydrocarbon product;
   f. third conduit means opening into the top of said reactor vessel for depositing fresh catalyst at the top of said catalyst bed, the opening of said third conduit means being below the opening of said second conduit means;
   g. fourth conduit means for withdrawing spent catalyst from the bottom of said catalyst bed, said fourth conduit means having an inlet opening facing generally downwardly within, and near the bottom of, said catalyst bed, said fourth conduit means including a first section extending upwardly from said inlet opening into a second section that extends generally downwardly outside said reactor vessel and directly into said catalyst receiving vessel, the ratio of the volume of the first section of said fourth conduit means to the total volume of said fourth conduit means being less than 0.1;
   h. porous support means affixed within said reactor vessel to prevent catalyst from entering said first conduit means; and
   i. pressure control means for maintaining a pressure in said catalyst receiving vessel during catalyst transfer less than the pressure in said reactor vessel, such that spent catalyst from said packed non-fluidized bed in a local region around said inlet opening of said fourth conduit means is fluidized sufficiently to initiate and maintain direct transport of catalyst from said reactor vessel into said receiving vessel.

5. The apparatus of claim 4 wherein the pressure control means comprises a fifth conduit means connected to said spent catalyst receiving vessel and said fifth conduit means includes a valve means for controlling the release of fluid from the spent catalyst receiving vessel.

* * * * *